(12) United States Patent
McMillan et al.

(10) Patent No.: US 7,121,758 B2
(45) Date of Patent: Oct. 17, 2006

(54) JOINT ARRANGEMENT

(75) Inventors: Alison J McMillan, Uttoxeter (GB); Kevin A White, Derby (GB)

(73) Assignee: Rolls-Royce plc, London (DE)

( * ) Notice: Subject to any disclaimer, the term of this patent is extended or adjusted under 35 U.S.C. 154(b) by 0 days.

(21) Appl. No.: 10/919,409

(22) Filed: Aug. 17, 2004

(65) Prior Publication Data
US 2005/0053419 A1    Mar. 10, 2005

(30) Foreign Application Priority Data
Sep. 9, 2003   (GB) ................................. 0321056.4

(51) Int. Cl.
*F16D 1/00*   (2006.01)

(52) U.S. Cl. .................. 403/408.1; 403/335; 403/336; 403/337; 60/226.1

(58) Field of Classification Search ............... 403/262, 403/335, 336, 337, 408.1; 60/226.1
See application file for complete search history.

(56) References Cited
U.S. PATENT DOCUMENTS
4,718,818 A *   1/1988  Premont .................... 415/9
4,929,113 A *   5/1990  Sheu ....................... 403/157

2003/0014964 A1 *   1/2003  Sathianathan et al.

FOREIGN PATENT DOCUMENTS
EP         1 277 919 A      1/2003

* cited by examiner

*Primary Examiner*—Daniel P. Stodola
*Assistant Examiner*—Nahid Amiri
(74) *Attorney, Agent, or Firm*—W. Warren Taltavull; Manelli Denison & Selter PLLC

(57) ABSTRACT

A joint assembly 80 is provided for limiting an extension of the joint 80 in the direction of a load path derived from an impact comprising. In its simplest form, the joint 80 comprises a first member 40 having a portion 82 and a second member 50 having a portion 84, the portions 82, 84 overlapping one another and arranged generally parallel to one another and secured together via securing means 78. The securing means 78 is disposed through corresponding holes 92, 94 defined by portions 82 and 84. At least one of the overlapping portions 82 or 84 further defines, sequentially in the direction of extension a pocket 102. The securing means 78 comprises a deformable member 152, 178 and at least one of the overlapping portions 82, 84 comprises a wedge-shaped portion 74. In the event of a worst-case impact load the securing means 78 is forced through the pocket 106 while the wedge-shaped portion 74 causes the deformable member 152 to deform and thereby increase the clamping force, in a progressive manner, to limit the extension of the joint assembly 80 and retain an integral joint assembly 80.

14 Claims, 4 Drawing Sheets

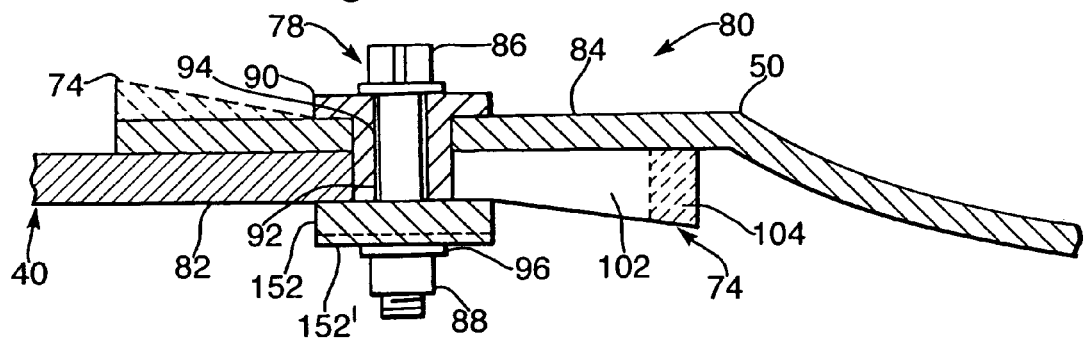
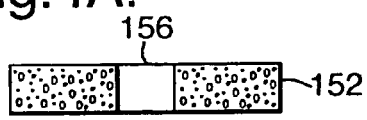
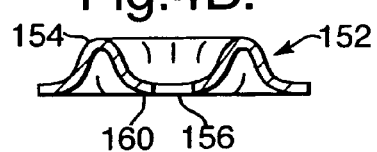
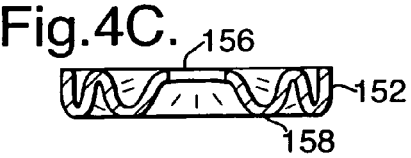
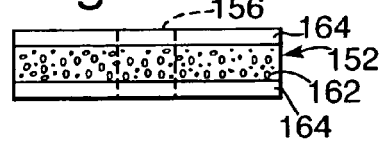
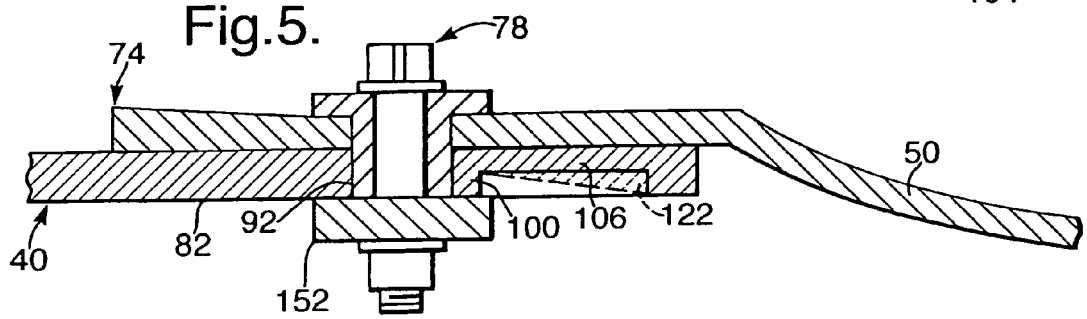
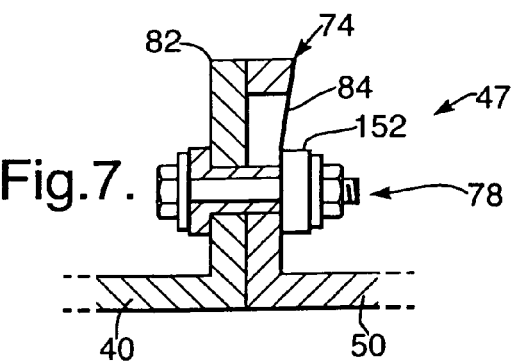

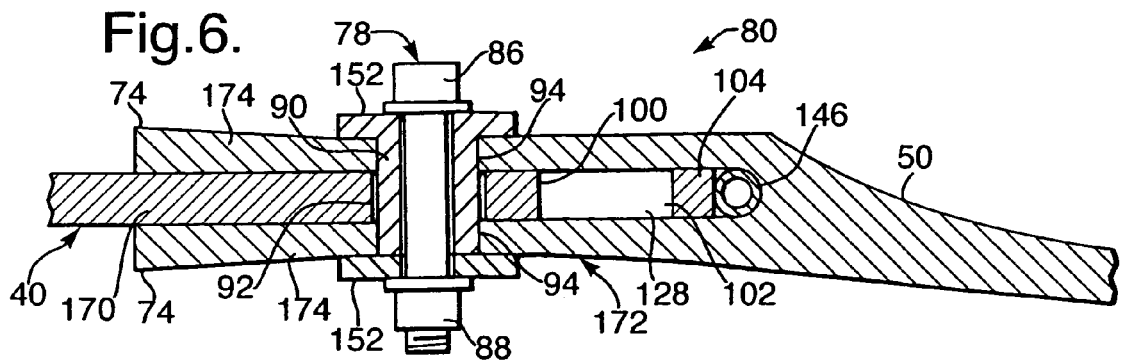
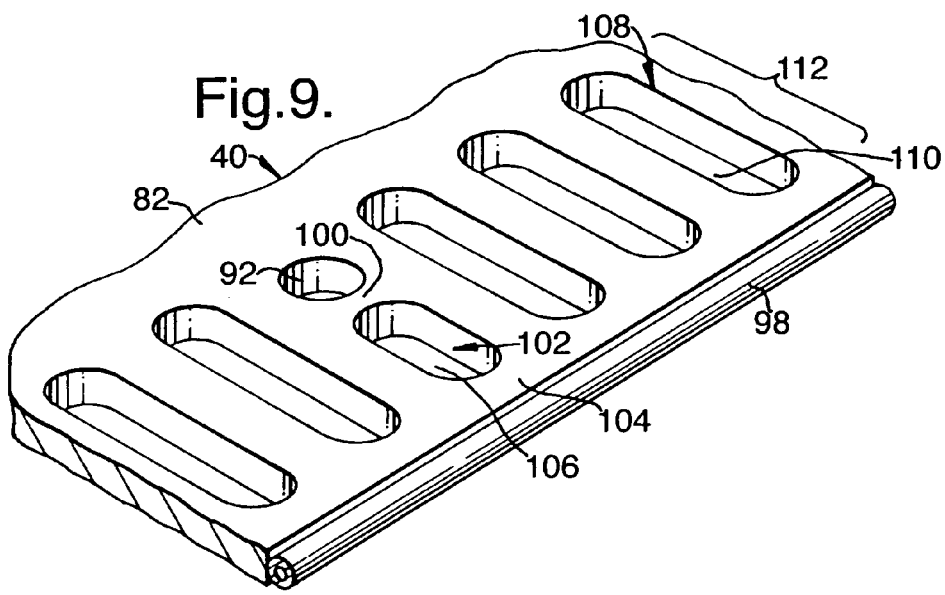
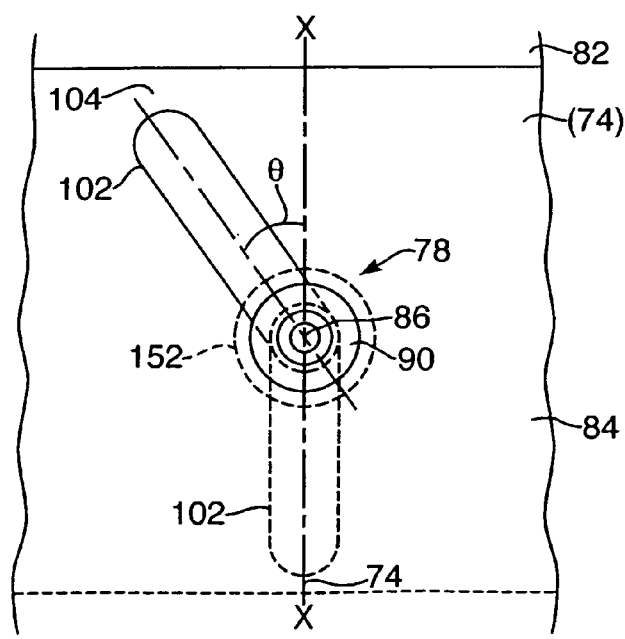

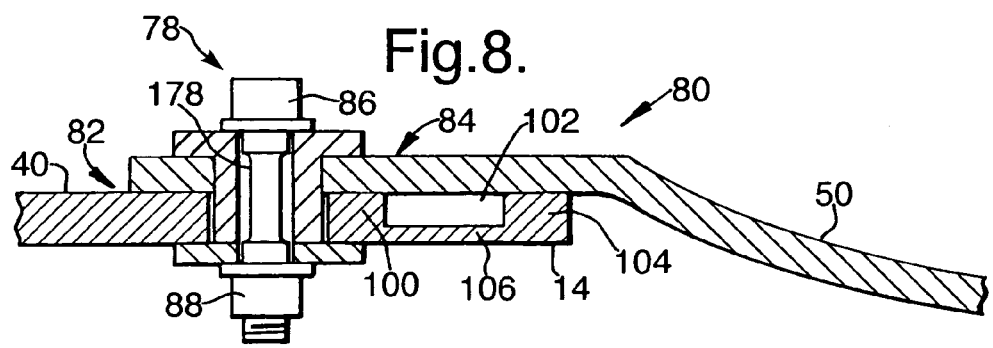
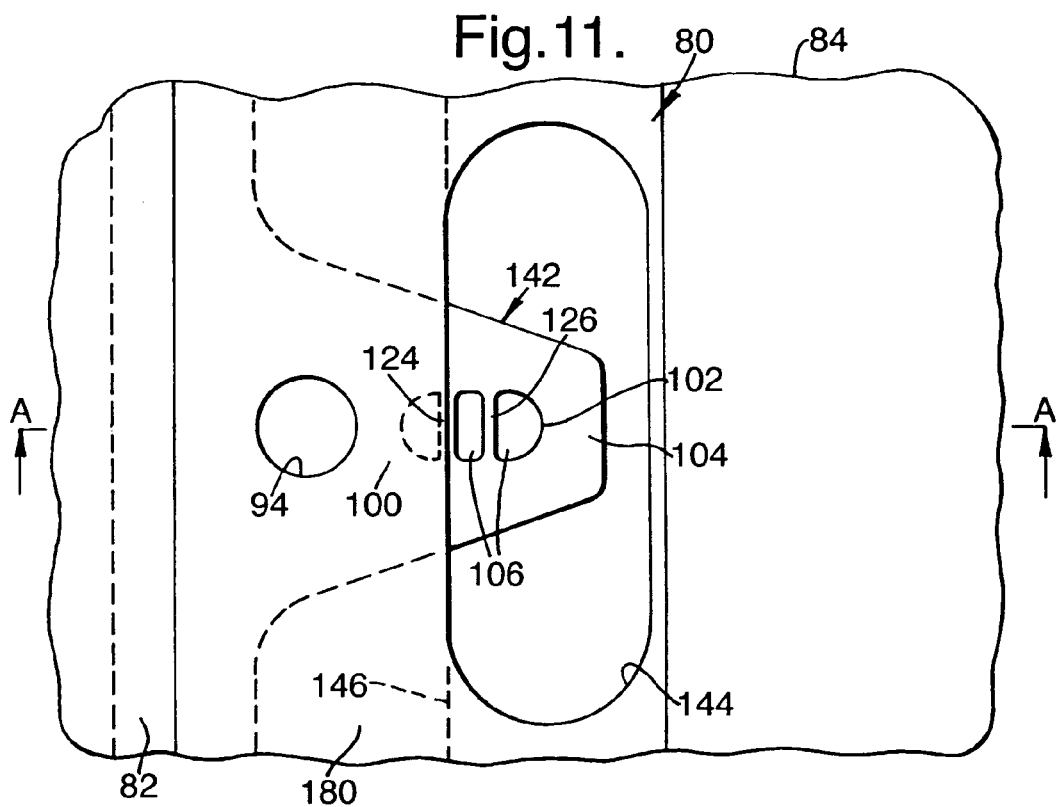
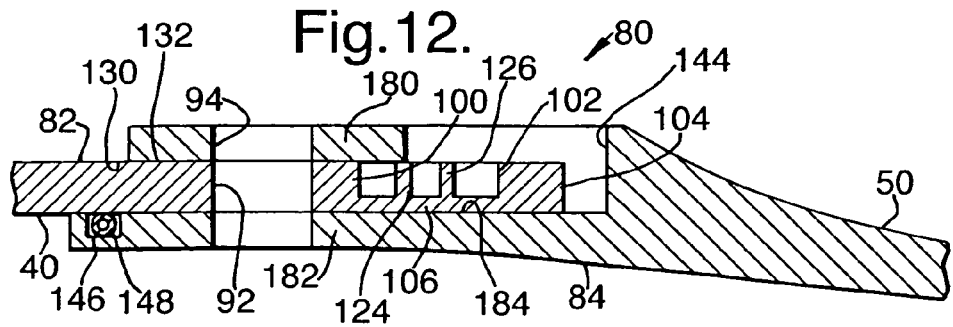

JOINT ARRANGEMENT

FIELD OF THE INVENTION

The present invention relates to a joint arrangement for limiting an extension of the joint generally in the direction of a load path derived from an impact load. In particularly, but not exclusively, the joint is used for a gas turbine engine fan casing and more particularly to an improved casing joint arrangement for use within or forming a part of the gas turbine engine blade containment assembly.

BACKGROUND OF THE INVENTION

Turbofan gas turbine engines for powering aircraft conventionally comprise a core engine, which drives a fan. The fan comprises a number of radially extending fan blades mounted on a fan rotor which is enclosed by a generally cylindrical, or frustoconical, fan casing. The core engine comprises one or more turbines, each one of which comprises a number of radially extending turbine blades enclosed by a cylindrical, or frustoconical, casing.

There is a remote possibility with such engines that part, or all, of a fan blade, or a turbine blade, could become detached from the remainder of the fan or turbine. In the case of a fan blade becoming detached this may occur as the result of, for example, the turbofan gas turbine engine ingesting a bird or other foreign object. It is a requirement that the fan blade element is contained within the engine and does not cause damage to an aircraft structure.

The use of containment rings for turbofan gas turbine engine casings is well known. It is known to provide generally cylindrical, or frustoconical, relatively thick metallic containment rings. It is also known to provide generally cylindrical, or frustoconical, locally thickened, isogrid, metallic containment rings. Furthermore it is known to provide strong fibrous material wound around relatively thin metallic casings or around the above mentioned containment casings. In the event that a blade becomes detached it passes through the casing and is contained by the fibrous material.

However, in the event that a blade becomes detached, the blade strikes the metal casing and a significant load is imparted from the main impact region of the metal casing to a flanged interface with an intake casing or rear fan casing.

It is normal practice to transfer the impact loads along the metal casing to the flanged interface joint with the intake or rear fan casing. The flanged interface is bolted together with an array of circumferentially spaced bolts. Under impact by a released fan blade, the flanged joint between the metal casing and the intake or rear fan casing has a tendency to open thus permitting an unwanted and substantial degree of movement of the joint. To counter this, the flanged joint is a substantial structure and is therefore of considerable weight. Furthermore it is a requirement for the bolts to resist the considerable shear force between casings and therefore the bolts are also of substantial number, size and weight. Nevertheless it is known that the integrity of the bolted flange joint can be lost and debris from a blade off event pass through the flanged joint. Furthermore, in order to provide an integral joint, the prior art flanged joint is relatively stiff compared with the rest of the fan casing, so that it resists deflection during impact, and as a result very high local stresses are developed in other parts of the casing, potentially leading to undesirable failure.

EP1277919, of the present applicant, discloses a joint assembly for limiting an extension of the joint in the direction of a load path derived from an impact. The joint assembly comprises a first member having overlapping portion that are arranged generally parallel to one another and are secured together via a conventional bolt assembly disposed through corresponding holes defined therein. One of the overlapping portions further defines, sequentially in the direction of extension, a shear neck, a pocket and a catcher portion. In the event of a worst case impact load the securing means shears through the shear neck and the pocket and is arrested by the catcher portion, thereby the extension of the joint assembly is limited and the joint assembly remains integral.

SUMMARY OF THE INVENTION

Accordingly the present invention seeks to provide a novel gas turbine engine casing joint which is of less weight, deforms more readily, is more compliant with the remainder of the fan casing and absorbs more energy and transfers less impact load to the intake or rear fan casing than has previously been the case.

Accordingly the present invention provides a joint assembly for limiting an extension of the joint in the direction of a load path derived from an impact comprising: a first member having a portion and a second member having a portion, the portions overlapping one another and arranged generally parallel to one another and secured together via securing means disposed through corresponding holes defined therein; at least one of the overlapping portions further defines, sequentially in the direction of extension a pocket; wherein the securing means comprises a deformable member and at least one of the overlapping portions comprises a wedge-shaped portion; so that in the event of a worst case impact load the securing means is forced through the pocket and the wedge-shaped portion causes the deformable member to deform and thereby increase the clamping force to limit the extension of the joint assembly and retain an integral joint assembly.

BRIEF DESCRIPTION OF THE DRAWINGS

The present invention will be more fully described by way of example with reference to the accompanying drawings in which:

FIG. 4 is an enlarged cross-sectional view of a the joint arrangement used for the fan blade containment assembly in accordance with the present invention;

FIG. 4A is cross-section through a first embodiment of a deformable washer shown in FIG. 4.

FIG. 4B is cross-section through a second embodiment of a deformable washer shown in FIG. 4.

FIG. 4C is side view of a third embodiment of a deformable washer shown in FIG. 4.

FIG. 4D is side view of a third embodiment of a deformable washer shown in FIG. 4.

FIG. 5 is an enlarged cross-sectional view of a second joint arrangement used for the fan blade containment assembly in accordance with the present invention;

FIG. 6 is an enlarged cross-sectional view of a third joint arrangement used for the fan blade containment assembly in accordance with the present invention;

FIG. 7 is an enlarged cross-sectional view of a fourth joint arrangement used for the fan blade containment assembly in accordance with the present invention;

FIG. 8 is an enlarged cross-sectional view of a fifth joint arrangement used for the fan blade containment assembly in accordance with the present invention;

FIG. 9 is a plan view of one overlapping portion of the joint arrangement of the present invention;

FIG. 10 is a plan view of an alternative arrangement of one overlapping portion of the joint arrangement of the present invention;

FIG. 11 is top view of a further arrangement of a portion of the fan blade containment assembly in accordance with the present invention;

FIG. 12 is an enlarged cross-sectional view A—A of arrangement of the portion of the fan blade containment assembly shown in FIG. 11.

DETAILED DESCRIPTION OF THE INVENTION

Figure 1:
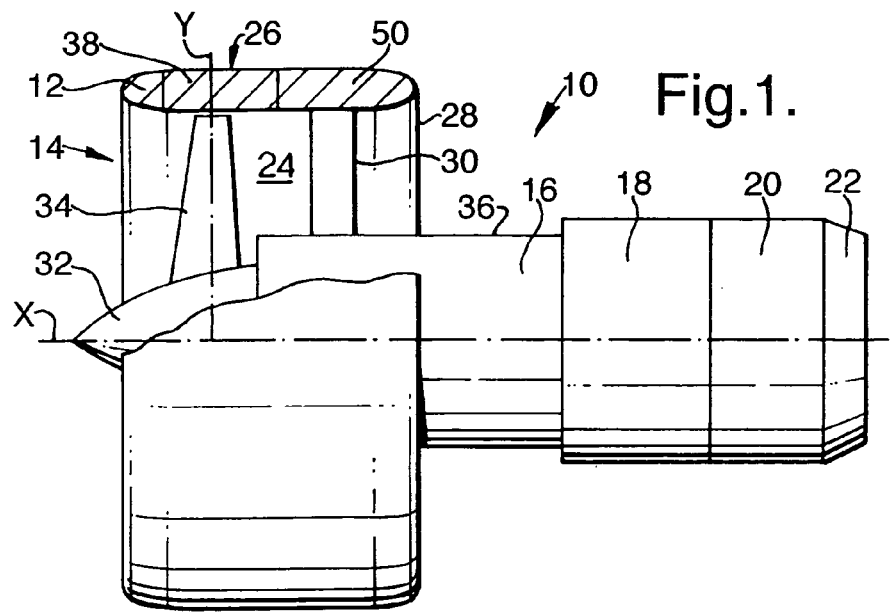
FIG. 1 is a partially cut away view of a gas turbine engine comprising a fan blade containment assembly.

With reference to FIG. 1, a turbofan gas turbine engine 10 comprises in flow series an intake assembly 12, a fan section 14, a compressor section 16, a combustor section 18, a turbine section 20 and an exhaust assembly 22. The turbine section 20 comprises one or more turbines arranged to drive one or more compressors in the compressor section 16 via shafts (not shown). The turbine section 20 also comprises a turbine to drive the fan section 14 via a shaft (not shown). The fan section 14 comprises a fan duct 24 defined partially by a fan casing assembly 26. The fan duct 24 has an outlet 28 at its axially downstream end. The fan casing assembly 26 is secured to a core engine casing 36 by a plurality of radially extending fan outlet guide vanes 30. The fan casing assembly 26 surrounds a fan rotor 32, which carries a plurality of circumferentially spaced radially extending fan blades 34. The fan rotor 32 and fan blades 34 rotate about an axis X of the gas turbine engine 10, substantially in a plane Y perpendicular to the axis X. The fan casing assembly 26 also comprises a fan blade containment assembly 38 and a rear fan casing 50, which are arranged substantially in the plane of the fan blades 34.

Figure 2:
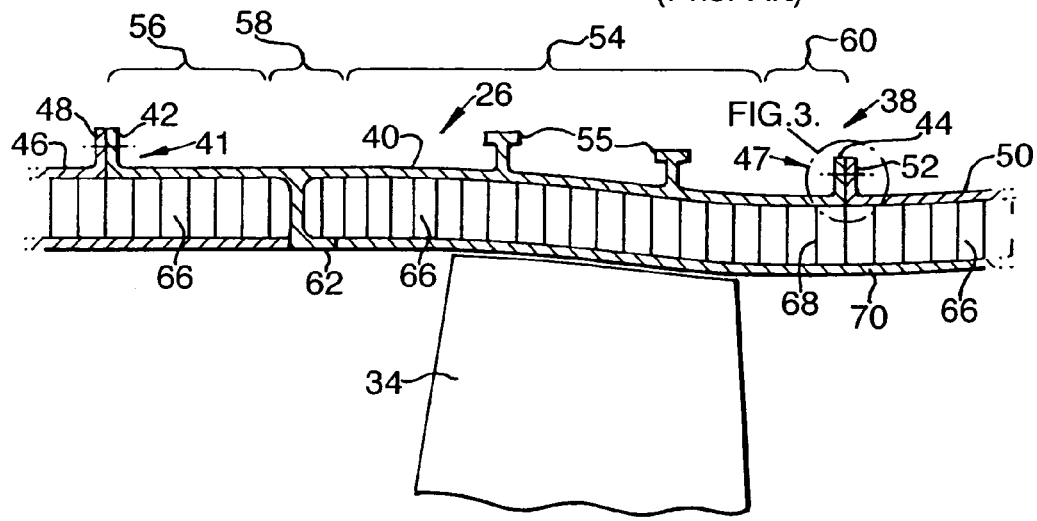
FIG. 2 is an enlarged cross-sectional view of a prior art fan blade containment assembly as generally shown in FIG. 1.
Figure 3:
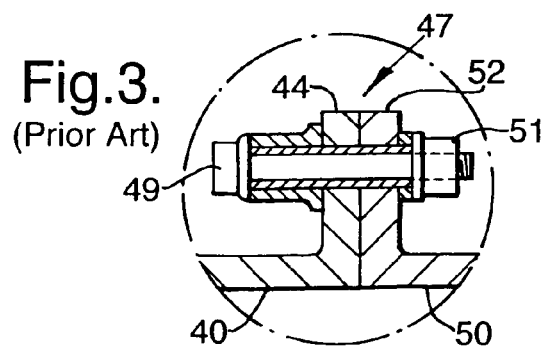
FIG. 3 is a further enlarged cross-sectional view through a portion of the prior art fan blade containment assembly shown in FIG. 2.

The fan casing assembly 26 and fan blade containment assembly 38 are shown more clearly in FIG. 2. The fan blade containment assembly 38 comprises a metal frustoconical casing 40, although it could be cylindrical if so desired. The metal casing 40 is connected to the fan blade containment assembly 38 at a flanged joint 41 comprising an upstream flange 42 bolted to a flange 48 of an intake casing 46 of the intake assembly 12. A downstream flanged joint 47 connects a flange 44 of the fan blade containment assembly 38 to a flange 52 on a rear fan casing 50 of the fan casing assembly 26.

The metal casing 40 provides the basic fan blade containment and provides a connection between the intake casing 46 and the rear fan casing 50.

The metal casing 40 comprises an upstream portion 56, a transition portion 58, a main blade containment portion 54 and a downstream portion 60. The upstream portion 56 comprises the flange 42 and the downstream portion 60 comprises the flange 52. The flange 42 on the upstream portion 56 of the metal casing 40 is fastened to the flange 48 on the intake casing 46 by a plurality of equally circumferentially spaced, axially extending, bolts 49 and associated nuts 51.

The upstream portion 56 is upstream of the plane Y of the fan blades 34 and provides debris protection for the fan blade containment assembly 38. The main blade containment portion 54 is substantially in the plane Y containing the fan blades 34 and comprises a radially inwardly and axially downstream extending flange, or hook, 62 at its upstream end. The main blade containment portion 54 may also comprise one, or more, integral T-section ribs 55, which extend radially outwardly, or alternatively inwardly, from the main blade containment portion 54. The T section ribs 55 extend circumferentially around the main blade containment portion 54 to strengthen the metal casing 40 to improve the fan blade 34 containment properties. The transition portion 58 connects the main blade containment portion 54 and the upstream portion 56 to transmit loads from the main blade containment portion 54 to the upstream flange 42 on the upstream portion 56. The rear fan casing 50 is downstream of the plane Y of the fan blades 34, and provides protection for where a root (not shown) of a fan blade 34 impacts the fan blade containment assembly 38 during a fan blade off event.

It may be desirable in some circumstances to provide a number of continuous layers of a strong fibrous material (not shown) wound around and radially outward the metal casing 40 (as known in the art) to further increase the energy absorbing capability of the fan blade containment assembly 38. The strong fibrous material may for example be woven aromatic polyamide fibres known as KEVLAR (KEVLAR is a registered trademark of Dupont Ltd). There may also be a number of layers of discrete pieces of flexible material woven from KEVLAR between the metal casing 40 and the continuous layers of fibrous material.

An acoustic lining 66 may be provided on the inner surface of the metal casing 40. The acoustic lining 66 comprises a honeycomb 68 and a perforate sheet 70. The honeycomb 68 and perforate sheet 70 are quite conventional. The ribs 55, if they are directed inwardly, work to spread impact load into the honeycomb.

In operation of the gas turbine engine 10, in the event that a fan blade 34, or a portion of a fan blade 34, becomes detached it encounters the metal casing 40. The main blade containment portion 54 of the metal casing 40 is impacted by the fan blade 34, or portion of the fan blade 34, and effectively removes kinetic energy from the fan blade 34, or portion of the fan blade 34.

The impact loads are transferred from the main blade impact portion 54 of the metal casing 40 to the flange 52 on the upstream portion 56 of the metal casing 40 through the transition portion 58 of the metal casing 40. The transition portion 58 is arranged to flex during the impact, due to its smoothly curved shape, to reduce the impact loads transmitted to the upstream flange 48. The impact loads are also transferred through the downstream portion 40 to the bolted flange 44, 52 and to the rear fan casing 50 of the fan casing assembly 26. It is important for the flanged joint 41 and particularly 47 to remain integral so that impact debris does not escape the fan casing assembly 26.

During impact the containment casing 38 is displaced radially outwardly and which intrinsically generates a great tensile force and a high bending moment across the flanged joint 47. The bolts 49 must also transfer high shear forces, particularly those in the region adjacent the blade 34 impact position. Thus the flanged joint 47 is a substantial structure, comprising a large number of bolts 49, and subsequently is heavy and bulky. Furthermore, in order to provide an integral joint, the prior art flanged joint is relatively stiff compared with the rest of the fan casing, so that it resists deflection during impact, and as a result very high local stresses are developed in other parts of the casing, potentially leading to undesirable failure. It is therefore desirous to provide a lighter joint that may also absorb more impact energy.

Referring now to FIG. 4, a joint arrangement 80 comprises overlapping portions 82 and 84 of the casing 40 and rear fan casing 50 respectively. The joint arrangement is an exemplary embodiment of the present invention and is intended to replace the prior art flanged joint 47 (and 41). In this first embodiment a first member is defined by the metal casing 40 and a second member is defined by the rear fan casing 50. The first and second members 40, 50 define the overlapping portions 82, 84. In this example the overlapping portions 82, 84 are arranged in conventional fashion and are generally annular in configuration although that is not necessary for other applications of the present invention. The overlapping portions 82 84 are secured together by a hollow pin 90, inserted through corresponding radially aligned holes 92 and 94 defined therein respectively. A bolt 86 extends through the hollow pin 90 and co-operates with a nut 88 and washer 96 in conventional fashion to secure the pin 90 together the portions 82, 84.

The overlapping portion 82 further defines, sequentially and in general axial alignment with the direction of extension of the joint 80 and a pocket 102. A catcher portion 104 is not essential to the present invention, however, a catcher portion 104 may additionally be utilised. Typically the pocket 102 is machined by any conventional method and extends to the hole 92. The hole 92 and pocket 102 may be machined in one operation so as to form a continuous slot.

The present invention is realised where the overlapping portion 82 comprises a generally wedge-shaped portion 74 and the securing means 78 is an extendible securing means 78. In this embodiment the extendible securing means 78 comprises a deformable member 152. In this embodiment the deformable member 152 is conveniently in the form of a washer. The deformable washer 152 is capable of being deformed between its un-deformed shape 152 and a deformed shape 152', as indicated by the dashed line. It should be readily understood that the wedge-shaped portion 74 may defined by either the overlapping portion 82 or 84, or may be present on both overlapping portions 82, 84 together.

In operation, the bolt assembly 78 is tightened to provide sufficient clamping force to prevent the casings 40, 50 moving axially relative to one another during normal engine 10 conditions. In practice a torque wrench (as known in the art) limits the force applicable by the bolt assembly 78 to the deformable washer 152, which is insufficient to compress the washer 152. In the unlikely event of a fan blade 34 or part of a fan blade becoming detached from the fan rotor 32 and impacting the casing 40, the casing 40 moves radially outward and consequently axially away from the rear fan casing 50. In so doing the wedge shaped portion 74 forces the bolt assembly 78 to extend via compression of the deformable washer 152. Depending on the force applied to the casing 40 and its resulting force to the joint assembly, the washer 152 is compressed between its original shape 152 and its fully deformed shape 152'. As the casings 40, 50 pull apart, the bolt 86 and hollow pin 90 pass through the pocket 102 until the washer has fully deformed and the securing means 78 prevents further axial movement of the casings. Where a catcher portion 104 is provided, the catcher 104 provides additional stopping means. Securing means therefore is capable of limiting the extent of the relative axial movement between the casings 40, 50.

The configuration of the joint arrangement 80 enables the casings 40, 50 to remain integral with one another preventing debris from egressing the casings 40, 50.

It is preferable that the washer 152 is elastically and plastically deformable so that a substantial amount more of blade impact energy is absorbed for generally elastic materials. FIG. 4A shows a deformable member 152 comprising a cellular structure 162, preferably formed using a foamed metal as known in the art. On compression the cellular structure begins to collapse, more easily to begin with, but then becoming stiffer and less compressible as the member 152 reduces in thickness. FIG. 4B shows a deformable member 152 comprising a raised land 154, capable of being deformed until the member is substantially flat and the thickness of the parent sheet. The raised land 154 is generally annular and surrounds a bolt-receiving hole 156 defined by the deformable member 152. The deformable washer 152 shown in FIG. 4C, comprises a generally sinusoidal-shaped rim 158 extending from a generally planar region 160 surrounding a bolt-receiving hole 156 defined by the deformable member 152. The deformable washer in FIG. 4D comprises a cellular structure 162 sandwiched between two facings 164, which are present to distribute compressive load evenly over the cellular structure 162. It should be appreciated to one skilled in the art that there are many other embodiments of compressible members, but the present invention is merely concerned with any such member having the capability of being sufficiently rigid not to compress during normal loading and compressible when subject to an impact load such as, for example, in this specific embodiment described herein.

Thus to reiterate the present invention the joint assembly 80 is provided for limiting an extension of the joint 80 in the direction of a load path derived from an impact comprising. In its simplest form, the joint 80 comprises a first member 40 having a portion 82 and a second member 50 having a portion 84, the portions 82, 84 overlapping one another and arranged generally parallel to one another and secured together via securing means 78. The securing means 78 is disposed through corresponding holes 92, 94 defined by portions 82 and 84. At least one of the overlapping portions 82 or 84 further defines, sequentially in the direction of extension a pocket 102. The securing means 78 comprises a deformable member 152, 178 and at least one of the overlapping portions 82, 84 comprises a wedge-shaped portion 74. In the event of a worst case impact load the securing means 78 is forced through the pocket 106 while the wedge-shaped portion 74 causes the deformable member 152 to deform and thereby increase the clamping force, in a progressive manner, to limit the extension of the joint assembly 80 and retain an integral joint assembly 80.

Referring now to FIG. 5, where like elements are given the same numerals as in FIG. 4, the overlapping portion 82 comprises a shear neck 100 formed between the hole 92 and the pocket 102. Thus the hole 92 and pocket 102 are separate apertures. During normal operation of the engine 10 it is intended that the shear neck 100 is sufficiently robust to carry normal operational loads. However, in the unlikely event of a fan blade 34 or part of a fan blade 34 being released and striking the containment casing 38, the shear neck 100 is intended to fail against the pin 90. After the pin 90 shears through the shear neck 100, and where the overlapping portion 82 continues to be forced generally axially away from the overlapping portion 84 until stopped by the catcher portion 104. The action of the overlapping portion 82 pulling through the shear neck 100 is indicative of the worst case impact loading condition possible and lesser impacts may result in a partial shear of the shear neck 100.

In addition or alternatively, a shear membrane 106 is provided in the overlapping portion 82, here the pocket 102 does not form an aperture through the portion 82. In this embodiment the membrane 106 is of constant thickness.

This arrangement of the joint 80 has two important aspects during a fan blade off event. Firstly, the arrangement utilises plastic deformation of the washer and where present the shear neck 100 and the shear membrane 106. On impact of a blade to the containment casing, the pin 90 shears through the shear neck 100, the deformable washer is compressed as the two overlapping portions are force axially apart and the securing means 78 is driven along and apart by the wedge portion 74 and the membrane 106 is also sheared through. The shear neck 100, washer 152 and membrane 106 are all plastically deformed which means that a high degree of energy is absorbed. Pure elastic impact resistance would require a more substantial structure as the total strength of the material is only utilised up to its elastic strain limit rather than the full plastic strain limit of the material. Secondly, it is desirable for the containment casing 38 to be able to fully deform subject to the blade 34 impact whilst the joint 80 remains integral. When struck by a released blade 34 the containment casing 38 is designed to deflect radially outward to absorb a substantial portion of the impact energy of the released blade 34, intrinsically drawing the adjacent rear fan casing 50 axially forward and radially outward. The deflection of the containment casing 38, during impact, can only be achieved if relative axial movement is possible between the metal casing 40 and the rear fan casing 50 of the fan casing assembly 26. The arrangement of the joint 80 and in particular the axial length of the membrane 106 (or pocket 102 at least) is configured to provide sufficient axial extension during a significant blade 34 impact event. Thus incorporation of this joint 80 allows the containment casing 38 to be designed to be flexible and lighter than existing designs, without compromising the integrity of the joint 80. Furthermore, following the impact event, the joint 80 becomes rigid, because the wedge re-loads the bolt 86, as the washer 152 is compressed. The inertia of the moving flange during the impact is sufficient to drive the joint 80 sufficiently far along the pocket 102 that the wedge re-tightens the bolt. Only in the most extreme circumstances, when the catcher 104 is reached does this not happen. Otherwise, catcher 104 is not necessary. The advantage of this is that the flange is held firmly in place, as the engine may windmill during the remainder of the flight, reducing vibration and the likelihood of fatigue and fretting fatigue in the flange, bolt threads and other neighbouring components.

For the pin 90 to shear through the material of the shear neck 100 a large initial load is required followed by a lesser load required to maintain shearing through the membrane 106 or pocket 102 thereafter. When the pin 90 has sheared through the shear neck 100 and membrane 106, it is intended that enough energy has been dissipated from the impact that the pin 90 is prevented from further shearing when it abuts the catcher portion 104. The catcher portion 104 is able to arrest further shearing as it represents a significant step change in the required shear load. Overall the impact energy is dissipated not only by the membrane and neck being sheared, but also by the containment casing 38 deflecting radially outwardly. Thus the ability of the joint 80 to undergo axial extension while remaining integral is an important aspect of the present invention.

The axial length of the pocket 102 and thickness of the membrane 106 will depend on a number of factors including the physical properties of material used for the overlapping portion 82, the size of the pin 94, the number of pins 94 and corresponding pockets 102, and most importantly the flexural characteristics of the containment casing 38 during blade 34 impact and which governs the amount of load transferred through the joint 80. It should be noted that for each different aero-engine application the length of the pocket 102 and membrane thickness 106 will be different and therefore should be designed accordingly.

Furthermore, the various embodiments of the present invention described herein may be further enhanced by the utilisation of a variable thickness membrane 122. In this embodiment the variable thickness membrane 122 increases in thickness in the axially downstream direction between the shear neck 102 and the catcher section 104. This embodiment is particularly useful in that the degree of energy absorbed by the membrane 122 increases as the pin 86 is pulled through the tongue portion 82. In this way the membrane 122 is able to distribute an increasing amount of energy to the surrounding overlapping portion 82, thereby limiting the degree of axial separation of the joint 80.

Referring to FIG. 6, the joint arrangement 80 of this third embodiment comprises the casing 40 defining a tongue portion 170 which cooperates with a groove portion 172 defined by the rear fan casing 50. Like elements are given like numerals as shown in other Figures and operate in similar manner. Each overlapping portion 174 or annular finger 174 of the groove portion 172 comprises a wedge shaped portion 74. The securing means 78 comprises a deformable member 152 disposed between the annular finger 174 and bolt 86 and nut 88 respectively.

The deformable members 152 are preferably identical as are the wedge shaped portion 74. However, the deformable members 152 may be of different compressibility so as to have an overall increase in resistance part way along the full axial extension of the joint.

Alternatively, only one annular finger comprises a wedge shaped portion 74 and only one deformable washer 152 may be provided.

A further aspect of the present invention is the provision of a deformable insert 128. Similar to the shear membrane previous described, the insert 128 is provided to give a high degree of plastic deformation when the joint 80 operates during a fan blade off event. Typically, the casings 40, 50 are made from steel or titanium and a deformable insert 128 would be preferable using a relatively lightweight and more malleable and ductile material than that of the casings 40, 50. The insert 128 is equally usable with a membrane 106 to increase the resistance of the pocket region 102.

An annular O-ring seal 146 is disposed in the groove portion 172 to prevent fluid leakage through the joint 80.

A fourth embodiment in FIG. 7 comprises the present invention applied to a conventional bolt flange joint 47. The securing means 78 is configured as any other embodiment described herein as are the overlapping portions 82, 84. This embodiment is employed where any axial movement required during a fan blade off event is accommodated by another feature elsewhere on the casing 40, containments casing 38 or rear fan casing 50. Essentially this joint is capable of accommodating radial loads in similar fashion to the previous embodiments that substantially accommodate relative axial displacements between overlapping portions.

Referring now to FIG. 8, the fifth embodiment of the joint arrangement 80 of the present invention is realised by the extendible securing means 78 comprising a deformable bolt shank 178 and at least one of the overlapping portions comprising a wedge-shaped portion 74. The figure shows the overlapping portion 82 defining a shear neck 100, a pocket 102, a shear membrane 106 and a catcher portion 104 as hereinbefore described. Within the pocket 102 may be disposed a deformable insert.

The deformable bolt shank 178 comprises a smaller cross-sectional area over at least a portion of its total length, between the bolt 86 and the nut 88. It is preferable for the smaller cross-section area portion to be a constant area, however, it may be waisted so as not to be of constant cross-section, for example part of it may be generally conical or frusto-conical.

The joint arrangement 80 operates in a similar manner as hereinbefore described, however, rather than the deformable washer being compressed as the wedge-shaped portion forces against the bolt assembly 78, the deformable shank portion 178 is elongated. The maximum extension caused by the wedge-shaped portion 74 is less than the maximum extension before failure of the deformable shank portion 178. Furthermore, a deformable washer 152 may be easily incorporated into this embodiment by the skilled artisan.

Referring to FIG. 9, the overlapping portion 82 further comprises an annular array of auxiliary pockets 108 which are generally axially extending and are arranged around the overlapping portion 82. A number of the auxiliary pockets 108 are disposed between each pocket 106 and define auxiliary membranes 110. As mentioned hereinbefore when the containment casing 38 is struck by a released blade 34 the casing 38 bulges outward in the area of the impact and in so doing draws the surrounding material toward the impact point. Thus as well as providing an axially extendable joint it is desirable to provide a means to allow the metal casing 40 to circumferentially extend. The arrangement of auxiliary pockets 108 and membranes 110 provide the overlapping portion 82 with a flexible circumferential band 112, which is capable of accommodating circumferential draw resulting from a blade 34 impact. Furthermore the auxiliary pockets 110 provide a weight reduction.

Referring to FIG. 10, each of the overlapping portions 82, 84 defines a pocket 102 as hereinbefore described. Pocket 102 defined in portion 82 is arranged generally axially (i.e. along X—X), whereas pocket 102 defined in portion 84 is arranged at an angle θ=45° to the axial direction. This angled pocket 102 is advantageous where the blade 34 impacts the containments casing 38 at a tangential angle, causing both a radially outward load and a tangential load having a resultant load generally in the direction of the pocket 102. Thus the securing means 78 is directed along the pocket 102 and the joint arrangement 80 operates as it is designed.

Where the load transmitted through the joint 80 is substantially in the axial direction, the pocket 102 defined by the overlapping portion 82 is axially aligned to accommodate this impact load. It should be readily understood to the skilled person that other angles of the pocket 102 might be used depending on the application. To accommodate axial and tangential components of the resultant total load it is possible to angle both pockets 102 from the axis X—X. For example one pocket may be at 90 degrees to the axial direction and the other parallel or one pocket at 60 degrees and the other at 30 degrees.

Referring now to FIGS. 11 and 12 where the same numerals have been used for like elements shown in previous Figures. The securing means 78 is omitted for clarity. In this embodiment the overlapping portion 82 of the metal casing 40 comprises a plurality of circumferentially spaced apart discrete tongue portions 142. The discrete tongue portions 142 comprise the same general arrangement of the hole 92, shear neck 100, pocket 102, membrane 106 and catcher portion 104 and which function in accordance with the present invention. The overlapping portion 84 comprises radially inner and outer fingers 182 and 180 respectively and which define a groove 184. Axially rearward of the groove 184 the overlapping portion 84 defines a plurality of circumferentially spaced apart radial slots 144 therein. The radial slots 144 effectively increase the axial length of the groove 184 locally so that, in use, the overlapping portion 82 engages the groove 184 and each discrete tongue portion 142 engages a corresponding radial slot 144.

This embodiment is intended to reduce the amount of and the difficulty of machining the groove portion 84 to the depth necessary for the required axial length of the tongue portion 82 (as shown in FIG. 4). During machining of a full length groove 184, the fingers 180, 182 have a tendency to pinch together causing undesirable contact with the cutting tool. Thus a shorter groove 184 provides a reduced amount of contact and improved quality. The groove 184 is now machined axially to the depth shown by the dashed line 146. The radial slot 144 is then machined in the groove portion 84 from a generally radial direction, hence the formation of the groove portion 84 is quicker and more simple. This joint arrangement 80 also provides a weight benefit by virtue of removal of tongue portion 82 material between the discrete tongue portions 142 and radial slot 144 material.

Although the discrete tongue portion 142 is shown generally as a trapezoid, it may be any suitable shape and may extend axially rearward of the slot 144. Although in this embodiment it is preferable for the slot 144 to be defined in the radially outer finger 180, the slot 144 may also be defined in a radially inner finger 182 of the groove portion 84.

Referring still to FIG. 12, a series of additional circumferentially extending shear necks 124, 126 and membranes 106 in alternate sequence are provided within the pocket 102. The additional shear necks 124, 126 are intended to control the amount of displacement that the joint 80 undergoes particularly if a blade 34 is released with a lower energy than the worst case impact. Thus during a blade 34 impact event at say 80% of the maximum rotational speed of the engine 10, the pin 86 is pulled through the shear necks 100, 124 and is stopped from further movement at the shear neck 126.

A further advantage of the shear necks 124, 126 is to increase the amount of energy distributed to the surrounding tongue portion 82 and provide step changes in the amount of energy required to fail the shear necks 124, 126 as opposed to the uniform membrane thickness shown in FIG. 4.

An annular O-ring seal 146 is disposed in a recess 148 defined in the radially inner finger 182 of the groove portion 84 and against the tongue portion 82 to prevent fluid leakage through the joint 80.

It should also be noted that the operation of the joint 80 may be further improved by increasing friction between the tongue portion 82 and the groove portion 84. By increasing friction more impact associated energy may be absorbed by the joint 80. It should therefore be appreciated that contact surfaces (130 on FIG. 12) may comprise a means for enhancing friction be rough or may have a friction enhancing coating applied thereto (132 on FIG. 12). Similarly, the resistance to differential movement between the tongue portion 82 and the groove portion 84 may be increased by increasing the force exerted by the nut 88 and bolt 86.

Increasing the force to overcome an increase of frictional contact may be used in conjunction with any of the embodiments described herein. The utilization of friction resistance may further enhance the reduction of the weight of the joint 80 as the shear neck 100, membranes 106, 118 and catcher portion 104 as well as the bolt 86 may be made less substantial.

The metal casing 40 may be manufactured from any suitable metal or metal alloy. Preferably the metal casing 40 comprises a steel alloy, aluminium, an aluminium alloy, magnesium, a magnesium alloy, titanium, a titanium alloy, nickel or a nickel alloy.

Although the invention has been described with reference to a metal casing it may be possible to use the invention on other types of casings.

Although the invention has been described with reference to bolts and nuts fastening the flanges together, other suitable fasteners may be used.

The invention has been described with reference to a fan blade containment assembly, however it is equally applicable to a compressor blade containment assembly and a turbine blade containment assembly.

Although the present invention has been described with reference to a ribbed metal containment casing, it is equally applicable to other types of containment casing, for example a fibrous material wound around a relatively thin metallic casing or a fibrous material wound around a ribbed metal containment casing.

It should be appreciated to the skilled reader that although the present invention has been described with reference to a casing of a gas turbine engine the present invention is equally applicable to any joining feature which may be subject to a sudden loading. This sudden loading may be an impact load or a shock load. Furthermore the joint arrangement described herein is equally applicable to the automotive industry and to other forms of transport, such as marine or rail, which may be subject to accidental or otherwise impact loads.

It should also be apparent that the joint assembly 80 may have more than one overlapping portion 82 and co-operating overlapping portions 84, the overlapping joints 80 being generally axially parallel to one another.

We claim:

1. A joint assembly for limiting an extension of the joint in the direction of a load path derived from an impact comprising:
    a first member having a portion and a second member having a portion, the portions overlapping one another and arranged generally parallel to one another and secured together via securing means disposed through corresponding holes defined therein;
    wherein the securing means comprises a deformable member and at least one of the overlapping portions comprises a wedge-shaped portion; so that in the event of a worst case impact load the securing means is forced through the pocket and the wedge-shaped portion causes the deformable member to deform and thereby increase the clamping force to limit the extension of the joint assembly and retain an integral joint assembly.

2. A joint assembly as claimed in claim 1 wherein the at least one of the overlapping portions further defines, sequentially in the direction of extension a shear neck and the pocket.

3. A joint assembly as claimed in claim 1 wherein the at least one of the overlapping portions further defines, sequentially in the direction of extension the pocket and a catcher portion.

4. A joint assembly as claimed in claim 1 wherein the at least one of the overlapping portions further defines, sequentially in the direction of extension a shear neck, the pocket and a catcher portion.

5. A joint assembly as claimed in claim 1 wherein the securing means comprises a bolt assembly.

6. A joint assembly as claimed in claim 1 wherein deformable member comprises a deformable washer, capable of being deformed between its un-deformed shape and a deformed shape when the securing means is forced through the wedge shaped portion.

7. A joint assembly as claimed in claim 6 wherein the deformable washer comprises a cellular material.

8. A joint assembly as claimed in claim 6 wherein the deformable washer comprises a cellular structure sandwiched between two facings.

9. A joint assembly as claimed in claim 6 wherein the deformable washer comprises a raised land, capable of being deformed until the washer is substantially flat.

10. A joint assembly as claimed in claim 9 wherein the raised land is generally annular around the washer.

11. A joint assembly as claimed in claim 9 wherein the raised land comprises a generally sinusoidal-shaped rim extending from a generally planar region.

12. A joint assembly as claimed in claim 5 wherein the bolt assembly comprises a deformable bolt shank, capable of being extended between its un-deformed shape and a deformed shape when the securing means is forced through the wedge shaped portion.

13. A joint assembly as claimed in claim 12 wherein the deformable bolt shank is waisted and the waisted portion is extendable.

14. A gas turbine engine comprising a fan blade containment assembly including a fan containment casing and a rear fan casing, the fan containment casing being connected to the rear fan casing at a joint assembly as claimed in claim 1.

* * * * *